United States Patent
McClure et al.

(10) Patent No.: US 6,867,958 B2
(45) Date of Patent: Mar. 15, 2005

(54) LOOP RESTORATION SCHEME FOR DISTRIBUTION FEEDERS

(75) Inventors: Graeme N. McClure, Highett Victoria (AU); Jeffrey L. McElray, Sr., Wendell, NC (US); Robert A. Smith, Sherborn, MA (US); Carl LaPlace, Raleigh, NC (US); David G. Hart, Raleigh, NC (US); William M. Egolf, Apex, NC (US)

(73) Assignee: ABB Technology AG (CH)

( * ) Notice: Subject to any disclaimer, the term of this patent is extended or adjusted under 35 U.S.C. 154(b) by 255 days.

(21) Appl. No.: 09/749,192

(22) Filed: Dec. 27, 2000

(65) Prior Publication Data

US 2002/0080539 A1 Jun. 27, 2002

(51) Int. Cl.[7] .................................................. H02H 3/00
(52) U.S. Cl. .................................... 361/72; 361/71
(58) Field of Search ............................ 361/72, 118, 71, 361/66, 65, 62, 63, 73

(56) References Cited

U.S. PATENT DOCUMENTS

| | | | | |
|---|---|---|---|---|
| 4,345,291 A | * | 8/1982 | Riebs | 361/68 |
| 4,384,213 A | * | 5/1983 | Bogel | 307/64 |
| 4,570,231 A | * | 2/1986 | Bunch | 702/59 |
| 4,680,706 A | | 7/1987 | Bray | 364/492 |
| 4,724,391 A | | 2/1988 | Blahous | 324/423 |
| 4,845,594 A | * | 7/1989 | Wilkerson | 361/71 |
| 5,428,549 A | | 6/1995 | Chen | 364/483 |
| 5,661,664 A | | 8/1997 | Novosel et al. | 364/492 |
| 5,798,939 A | | 8/1998 | Ochoa et al. | 364/493 |
| 5,818,673 A | | 10/1998 | Matsumaru et al. | 361/63 |
| 5,838,525 A | | 11/1998 | Ward et al. | 361/69 |
| 5,905,615 A | | 5/1999 | Rivetti et al. | 361/63 |
| 5,912,604 A | | 6/1999 | Harvey et al. | 335/9 |
| 5,936,817 A | * | 8/1999 | Matsko et al. | 361/72 |
| 6,018,449 A | * | 1/2000 | Nelson et al. | 361/66 |
| 6,341,054 B1 | * | 1/2002 | Walder et al. | 361/66 |
| 6,657,837 B1 | * | 12/2003 | Morris et al. | 361/72 |

OTHER PUBLICATIONS

Royster, T., "Virginia Power Implements Recloser Loop Schemes", *The Line*, Aug. 1998, pp. 3, 4 and 11.

* cited by examiner

*Primary Examiner*—Stephen W. Jackson
*Assistant Examiner*—Zeev Kitov
(74) *Attorney, Agent, or Firm*—Paul R. Katterle, Esq.; Johnathan M. Waldman, Esq.; George J. Awad, Esq.

(57) ABSTRACT

A system and methods that enable a restoration scheme for power distribution systems that is independent of power distribution system component configuration, the number of power distribution system components, and component settings are provided. In a power distribution system, a number of intelligent reclosers having restoration control modules are deployed that execute a restoration scheme. The intelligent reclosers constantly poll cooperating power distribution lines to determine changes in current or voltage provided by the power distribution lines. In the event of a power distribution system fault, the reclosers act in accordance to a predefined restoration scheme to reanimate the unaffected portions of the failing power distribution system.

14 Claims, 13 Drawing Sheets

LOOP RESTORATION SCHEME FOR DISTRIBUTION FEEDERS

FIELD OF THE INVENTION

The present invention relates to power distribution systems, and more particularly, to providing power distribution systems utilizing a restoration scheme to efficiently overcome power distribution system failures.

BACKGROUND OF THE INVENTION

The basic function of a power system is to continuously maintain adequate and reliable supply of electric power. However, performing this function is not always possible because various types of failures occur randomly beyond the control of power system engineers. Power system planners, designers, and operators are generally concerned with the reliability of the power system and then calculate approximately the realistic availability of their system. Recently, this concern has been accentuated by increasing competition among utility companies due primarily to de-regulation of the electrical power industry. Now, utility companies that once shared information across a common electrical grid are competing against themselves to provide distinguishable services in an effort to sustain existing customers and attract new customers.

Residential and business customers alike are increasingly dependent on power. From a simple switch to complex manufacturing equipment, power is required everyday. As a result of this new competition and the importance of power to customers, power systems are required to provide reliable, dependable, and more affordable power. Globally, power system engineers who maintain the operation and control of electrical power are challenged daily by consequences of electrical power being disrupted that translates directly to the quality, reliability and cost of electrical power. Utility companies have taken notice since the consequences of long-term unavailability and persistent interruption of electric power could directly translate to a loss of power customers.

The techniques first used in practical applications of power system design were developed to account for random failures. These techniques were generally deterministic in nature. Their primary weakness was a lack of consideration for the stochastic nature of system behavior, customer demands, and equipment failures.

In an effort to overcome power system limitations, power system equipment manufacturers developed devices, such as, power distribution protective relays and reclosers with control and operation schemes to achieve automated restoration of power systems. Existing restoration schemes, however, are rigid, requiring pre-defined configurations of power distribution system equipment and requiring pre-determined device settings.

Presently, there exist power distribution equipment incorporating restoration schemes that assist in bringing a power distribution system online in the event of a fault or loss of voltage. However, these restoration schemes place inflexible limits on the power distribution system. Such limits include pre-defined quantity, configuration and operation settings of equipment used in a restoration scheme.

From the foregoing, it is appreciated that there exists a need for a power system and method providing a robust restoration scheme that can be applied to power distribution systems, independent of power system equipment configuration or settings.

SUMMARY OF THE INVENTION

The present invention provides automatic restoration of power distribution systems independent of power distribution system equipment, configuration and settings. A power distribution system has equipment in a variety of configurations; the present invention provides a solution such that in the event of a fault or loss of voltage, the equipment that are proximate to the fault, in a closed state, are all tripped to an open state. Subsequently, the equipment determines if there is voltage on either side of the equipment. If there is voltage on both sides, processing by the equipment ceases. However, if the contrary is true (e.g. one source of line voltage entering the equipment or the other source of line voltage leaving the equipment is de-energized), the equipment determines which source side is energized and initiates a close, such that current flows from the energized voltage source of the equipment to the de-energized source. In the event that the processing component is positioned in series to a power system circuit breaker the equipment is left open regardless.

The invention permits the power distribution system to perform the automated restoration regardless of the number of equipment, configuration of the equipment, or equipment settings.

The invention further provides the power distribution system comprise power distribution components having microprocessors and logic capable of processing voltage levels and/or current levels along and/or across a cooperating power line and controlling the flow of current along and/or potential drop across said cooperating power line.

BRIEF DESCRIPTION OF THE DRAWINGS

The system and methods providing a restoration scheme for power distribution systems in accordance with the present invention are further described with reference to the accompanying drawings in which.

DETAILED DESCRIPTION OF PREFERRED EMBODIMENTS

Figure 1:
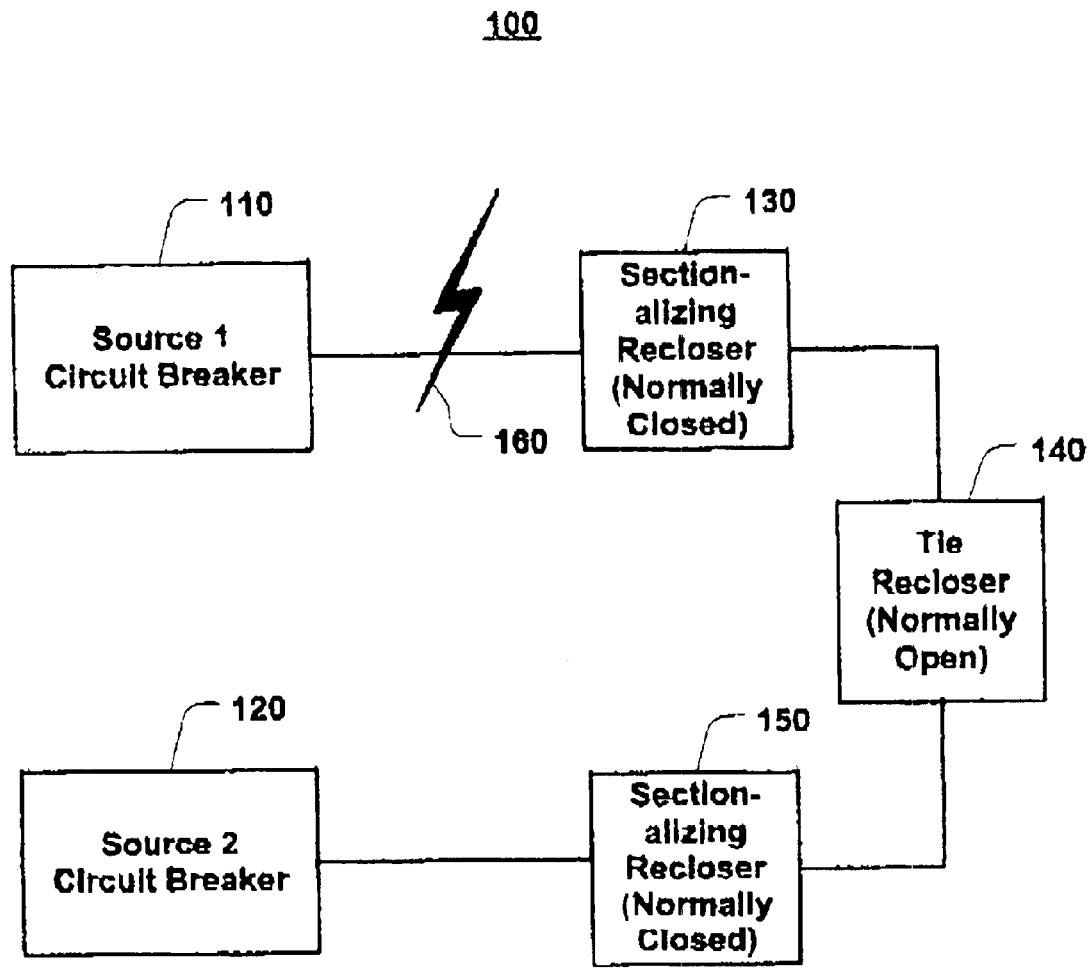
FIG. 1 is a system diagram of a prior art power distribution system employing a prior art restoration scheme.

Power Distribution Systems Overview:

Electrical transmission lines and power generation equipment must be protected against isolated faults and consequent short circuits, which could cause a collapse of the power system, serious and expensive equipment damage, and personal injury. It is the function of the protective relays, circuit breakers and reclosers, which monitor ac voltages and currents, to locate line faults and initiate isolation by the tripping of circuit breakers or reclosers.

Reclosers are usually used to minimize power distribution interruptions caused by transient (e.g. temporary) and/or permanent faults. Typically, during a system disturbance, large increases in current occur. Sensing a current increase, the recloser will open thereby cutting off current flow in order to protect power distribution system equipment connected to the power distribution system. Since many fault conditions are temporary, the recloser is designed to close after a short period of time, thereby re-establishing normal current flow. For example, during a thunderstorm, if lighting were to strike the distribution system, the power to one's home may be disrupted for few seconds causing lights and appliances to turn OFF (recloser opening), then ON (recloser closing). Once the recloser closes, if it senses the continued presence of increased current, it will again open. Such cycling between open and closed may occur a number of times before the recloser remains open. In this case, lockout occurs, a state in which the temporary fault becomes a permanent fault.

Comparatively, power distribution system protective relays and circuit breakers operate similarly to reclosers such that when circuit breakers open, they do not allow current to flow through, and when they are closed, allow current to pass.

To capitalize on the functions of today's power distribution system equipment, power distribution operators have developed restoration schemes to automate the process of reanimating a failed power distribution system. These schemes exploit the intelligence found in power distribution system equipment. Specifically, power distribution system equipment, such as, control devices for reclosers comprise a central processing unit (CPU), memory storage means, a power supply module, a communication module, a digital input/output module, and PT/CT (Potential Transformer/Current Transformer) A/D (Analog-to-Digital) module. A set of instructions indicative of a power restoration scheme may be stored in the memory storage means of the control device for the recloser to perform. Accordingly, the restoration scheme may be active when the reclosers of a power distribution system act in accordance to roles pre-defined by the stored instructions. For example, a power distribution system may comprise a number of reclosers having a predefined configuration (e.g. configuration as defined by the restoration scheme) that allow the flow of current along the power distribution system. When a fault occurs in the power distribution system, the reclosers act in accordance to the pre-defined instructions to isolate the fault and attempt to energize the remaining undisturbed portion of the power distribution system. This, however, entails the use of specific control devices and reclosers performing very specific functions to realize the overall operation of the restoration scheme rendering such restoration schemes as extremely rigid.

A more effective power distribution system would provide a power distribution system protection and restoration scheme that would be independent of power distribution system equipment providing fault protection and system restoration according to predefined set of rules realized through intelligent power distribution system circuit breakers, protective relays, and reclosers.

As will be described below with respect to FIGS. 1–6, the present invention is directed to power distribution systems and methods that provide a robust restoration scheme. In accordance with an illustrative implementation thereof, the present invention comprises systems and methods that employ power distribution system equipment capable of sensing voltage and current to employ a restoration scheme for reanimation of failed power distribution systems.

In an illustrative implementation, described more fully hereinafter, the methods and apparatus of the present invention may be implemented as part of a power distribution system having reclosers with voltage sensing transformers. Although the depicted embodiment provides systems and methods employing exemplary power distribution components having a particular configuration, those skilled in the art will appreciate that the inventive concepts described herein extend to various types of power distribution components having varying configurations.

Figure 2:
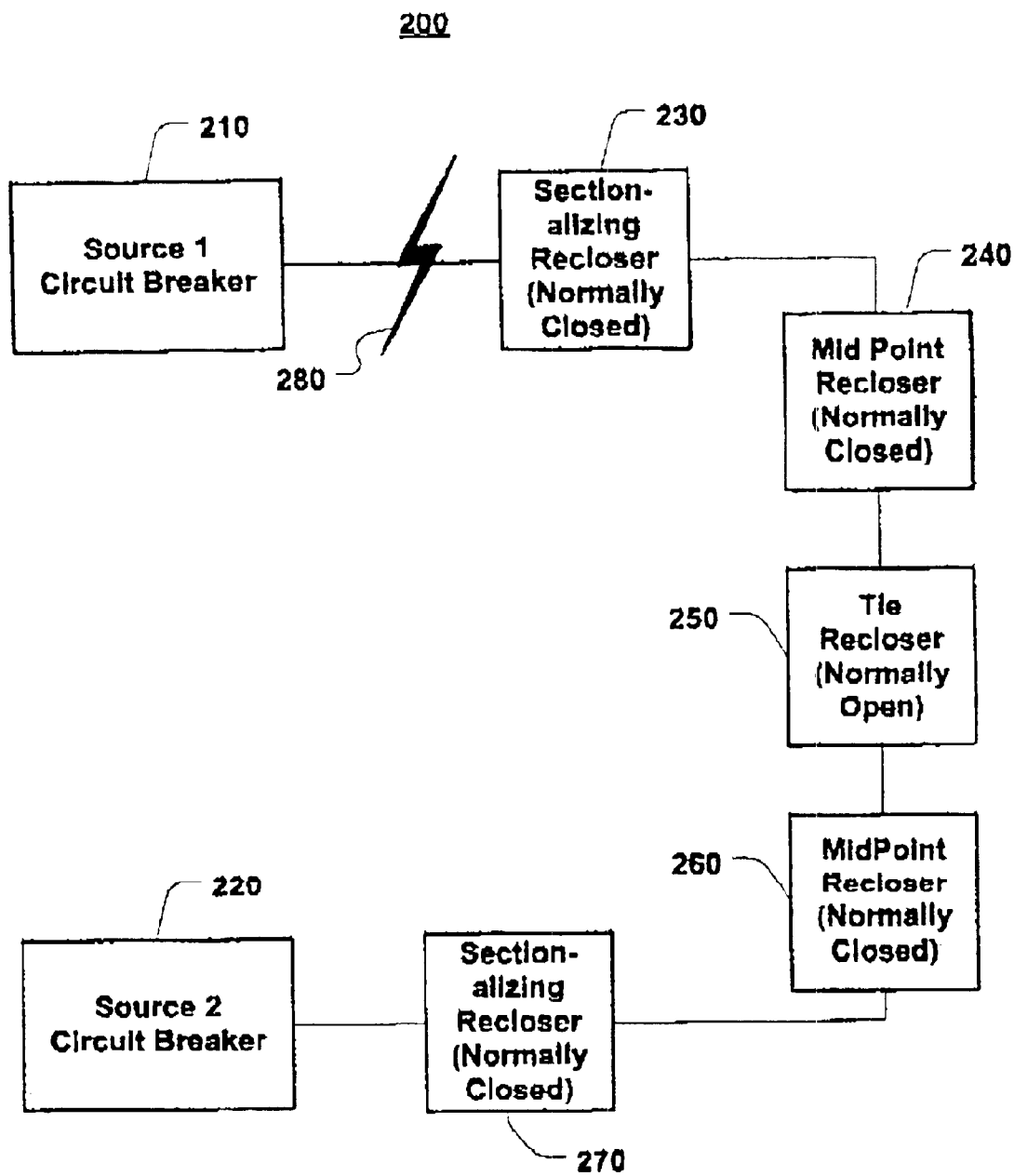
FIG. 2 is a system diagram of an alternative prior art power distribution system employing a prior art restoration scheme.

Restoration Schemes Implementation:

FIGS. 1 and 2 show prior art restoration schemes for power distribution systems. FIG. 1 shows a three-recloser restoration scheme for a power distribution system. As shown in FIG. 1, power distribution system 100 comprises a first source 110 and second source 120. A circuit is completed from first sources 110 to second source 120 as first source 110 is connected to sectionalizing recloser 130. In turn sectionalizing recloser 130 is connected to tie-point recloser 140 that is connected to sectionalizing recloser 150. Lastly, sectionalizing recloser 150 is connected to second source 120 to complete the circuit. Further, as shown fault 160 may occur in power distribution system 100 such that current is interrupted between first source 110 and the rest of the power distribution system 100 circuit. The area where the fault occurs is referred to as the fault zone.

Generally sectionalizing reclosers 130 and 150 have the characteristics of being placed close to the power station (e.g. first source 110 and second source 120). In operation, sectionalizing reclosers 130 and 150 trip and lock out (e.g. open) after a programmed time upon the loss of voltage from a sensing transformer (not shown) in the fault zone. Comparatively, a tie-point recloser is placed between cooperating circuits (e.g. between two power sources) and operates in an open state (e.g. not allowing current to flow through). In operation, the tie-point recloser closes (e.g. allowing current to flow through) after a programmed time.

In the three-recloser scheme illustrated in FIG. 1, if the circuit is faulted between first source 110 and sectionalizing recloser 130 by fault 160, first source circuit breaker recognizes the fault and locks out. Using a voltage-sensing transformer sectionalizing recloser 130 will recognize the loss of voltage and automatically open for a predetermined time period, isolating the faulted zone within the circuit. In conjunction, the tie-point recloser 140 will recognize a loss of voltage on the first source portion of the loop scheme. This, however, requires the presence of a tie-point recloser between the sectionalizing reclosers, thereby rendering this restoration scheme as inflexible. After a time delay, tie-point recloser 140 will close to establish service back to the sectionalizing recloser 130.

FIG. 2 shows a restoration scheme employing five reclosers. As shown, power distribution system 200 comprises first source breaker 210, a second source breaker 220, sectionalizing reclosers 230 and 270, respectively; mid-point reclosers 240 and 260, respectively, and tie-point recloser 250. Sectionalizing reclosers 230 and 270, and tie-point recloser 250 operate exactly as their counterparts in the three recloser restoration scheme described by FIG. 1. The five-recloser restoration scheme contemplates the use of an additional type of recloser that is, mid-point reclosers 240 and 260. Mid-point reclosers 240 and 260 are placed between sectionalizing reclosers and tie-point reclosers. Further, during fault-free power distribution system operation, mid-point reclosers 240 and 260 stay closed. In operation, mid-point reclosers 240 and 260 monitor a voltage-sensing transformer (not shown). If there is dead voltage, mid-point reclosers 240 and 260 change their minimum trip value as it prepares to be back-fed from an alternative source (e.g. if a fault occurs between first source 210 and mid-point recloser 240, mid-point recloser 240 will expect to be fed from second source 220).

In the five-recloser restoration scheme described in FIG. 2, if the circuit is faulted between first source 210 and sectionalizing recloser 230 as indicated by fault 280, first source breaker 210 will recognize the fault and lock out. Using a single voltage-sensing transformer, the sectionalizing recloser (e.g. 230 or 270) will recognize the dead voltage and open automatically isolating the faulted zone within the circuit. The mid-point recloser (e.g. 240 or 260) automatically changes its trip settings to allow proper operation during a back-feed condition from the tie-point recloser 250. In addition, tie-point recloser 250 recognizes a dead voltage on the first source 210 portion of the loop scheme. After a predetermined time delay, tie-point recloser 250 closes to establish service back to the sectionalizing recloser (e.g. 230 or 270). Tie-point recloser 250 also changes its operation to one-shot to lockout in case it may be closing into a fault. After a programmed time, tie-point recloser 250 changes back to its original settings (e.g. three tries until lockout). Once again, the success of the restoration scheme is dependent on the configuration of the distribution system components.

The above restoration schemes provide viable methods to restore power distribution systems having faults. However, these schemes present several shortcomings, such as, the need of manual resources to clear the fault, to close the sectionalizing recloser, and to open the tie-point recloser to its normal state. As such, two or three line crews, may be required to go out into the field and communicate with each other to repair the faulted line, to close the sectionalizing recloser to parallel the system and, lastly, to open the tie-point recloser.

The present invention aims to ameliorate these shortcomings by providing automated restoration of power distribution systems. Specifically, the restoration scheme of the present invention automatically sets a new open point thereby eliminating the need to open the tie-point recloser. The recloser loop control scheme of the present invention employs a plurality of reclosers installed in series between two substation feeder circuits of a power distribution system. This provides isolation of any faulted section within a given distribution circuit while simultaneously re-establishing service to all customers unaffected by the faulted section within a short period of time. The details of which are described by FIGS. 3–5.

Figure 3:
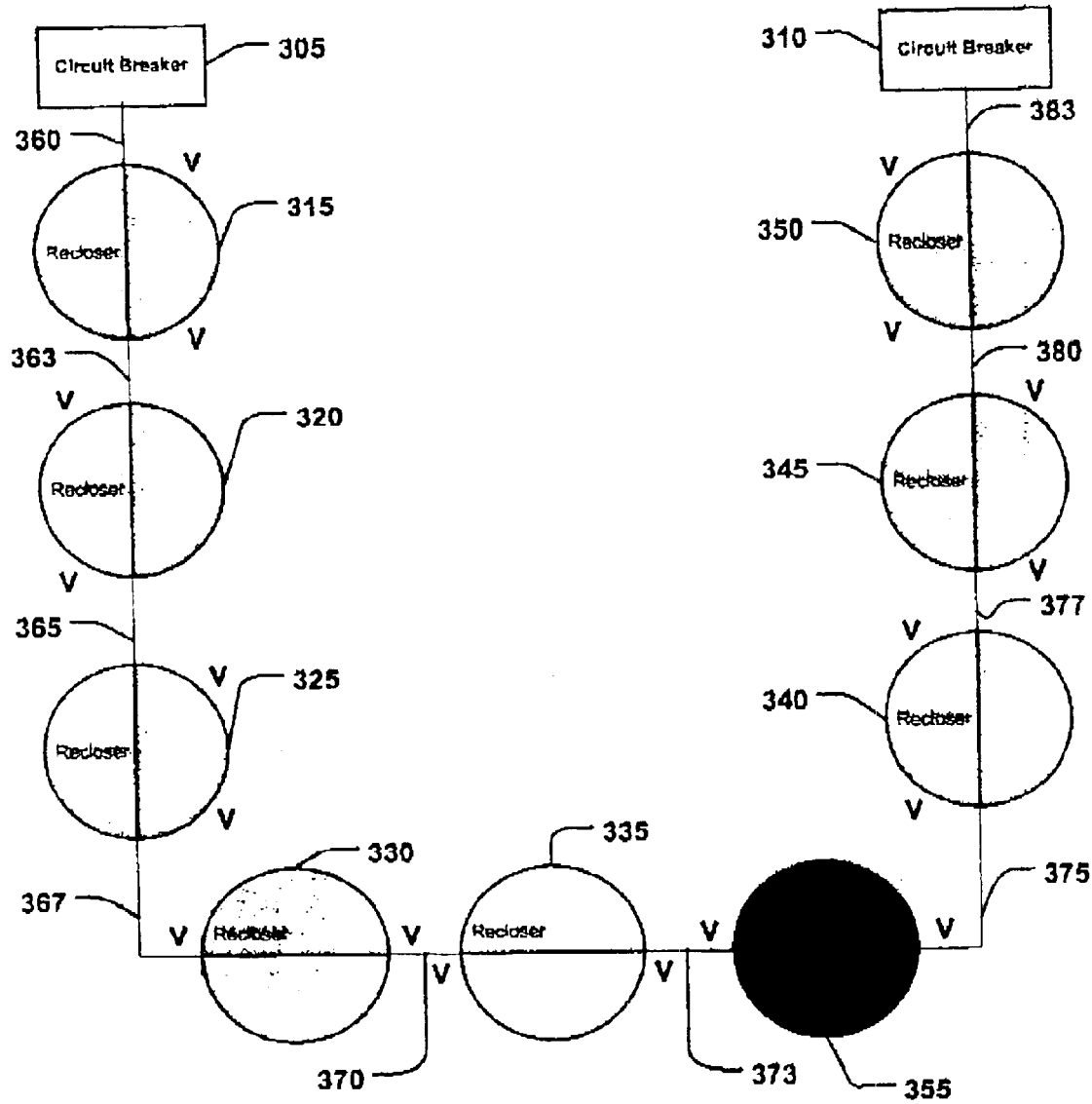
FIG. 3 is a system diagram of an exemplary power distribution system having exemplary power distribution components that are capable of realizing a restoration scheme in accordance with the present invention.
Figure 3A:
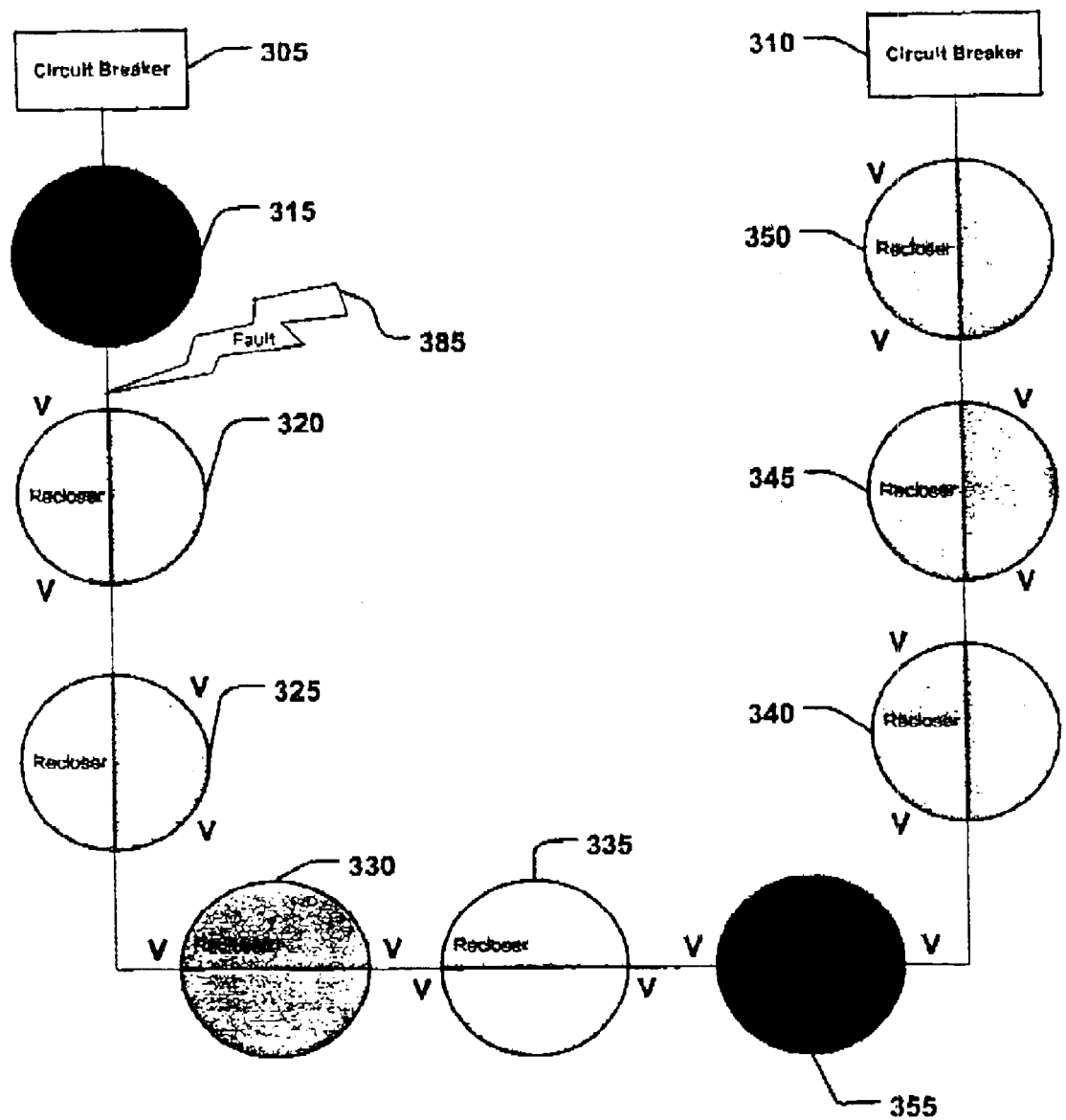
FIGS. 3A–3G are system diagrams showing the states of an exemplary power distribution system employing the restoration scheme in accordance with the present invention.

System Overview:

FIG. 3 shows an exemplary power distribution system 300 employing the restoration scheme of the present invention. Power distribution system 300 comprises, source circuit breakers 305 and 310, a plurality of standard reclosers (e.g. 315, 320, 325, 330, 335, 340, 345, 350), and sectionalizing recloser 355. The reclosers are equipped with sensing transformers on the input and output sides enabling the recloser to monitor current and/or voltage levels at the input and output. In operation, power distribution system 300 allows voltage and current to flow from source circuit breakers 305 and 310 to power distribution nodes 360, 363, 365, 367, 370, 373, 375, 377, and 380.

The power distribution system shown in FIG. 3 is shown to be operating in a fault-free state. In a fault-free state, power is distributed from source breaker 305 and through reclosers 315, 320, 325, 330, and 335 such that power may be delivered to power distribution nodes 360, 363, 365, 36, 370, and 373, respectively. Similarly, power is distributed in the rest of power distribution system through source breaker 310. Power passes from source breaker 310 to reclosers 350, 345, and 340 supplying power to power distribution nodes 383, 380, 377, and 375. Sectionalizing recloser 355 serves an important role as it breaks up power distribution system into independent functioning sections. As such power distribution system is allowed to have two source circuit breakers 305 and 310 to service all of the power distribution nodes. In operation reclosers 315, 320, 325, 330, 335, 340, 345, and 350 remain closed allowing power to pass through. Comparatively, sectionalizing recloser 355 remains open under normal operation such that power serviced from source breaker 305 does not interfere with power serviced from source breaker 310.

Figure 3B:
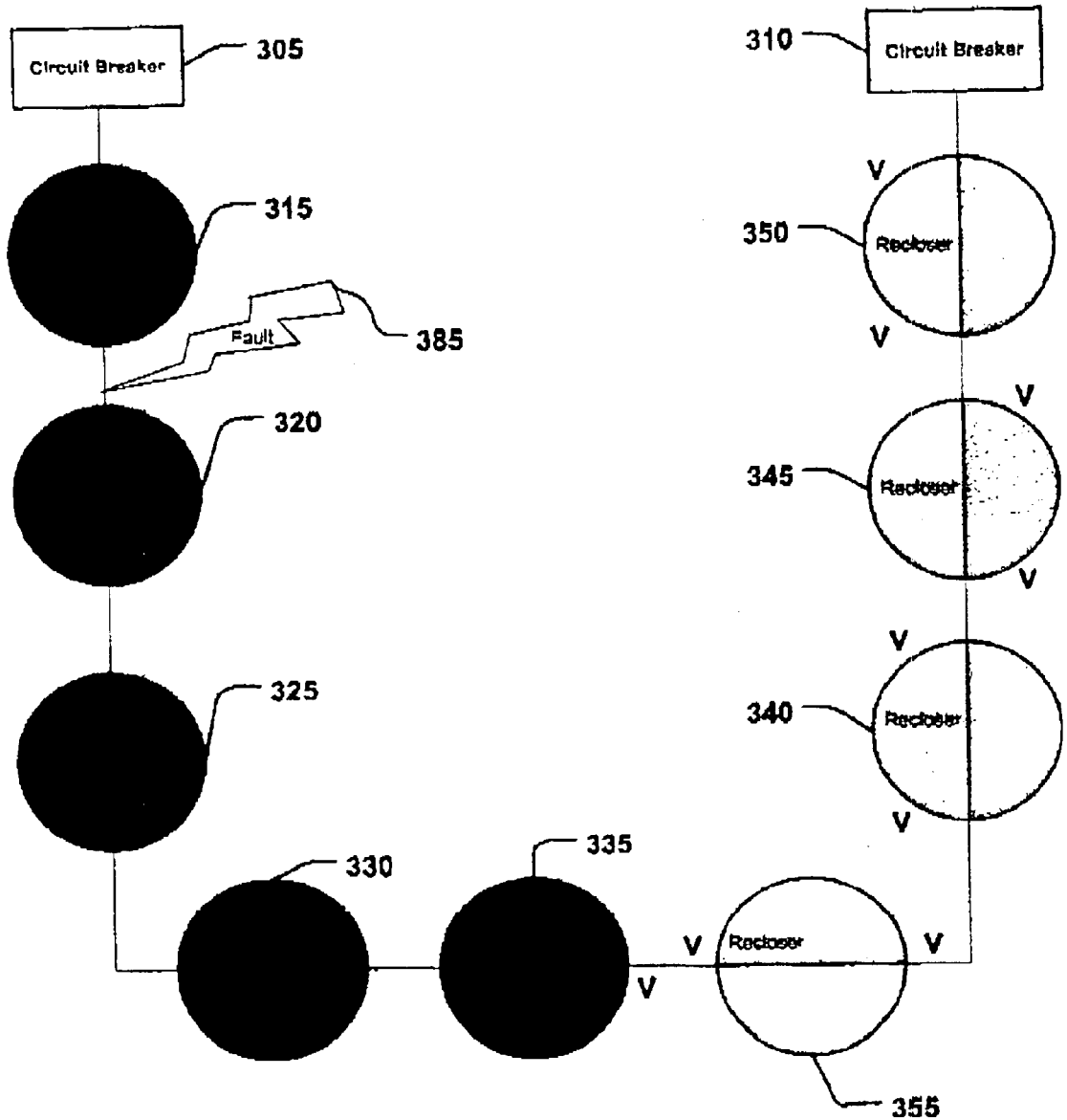
Figure 3C:
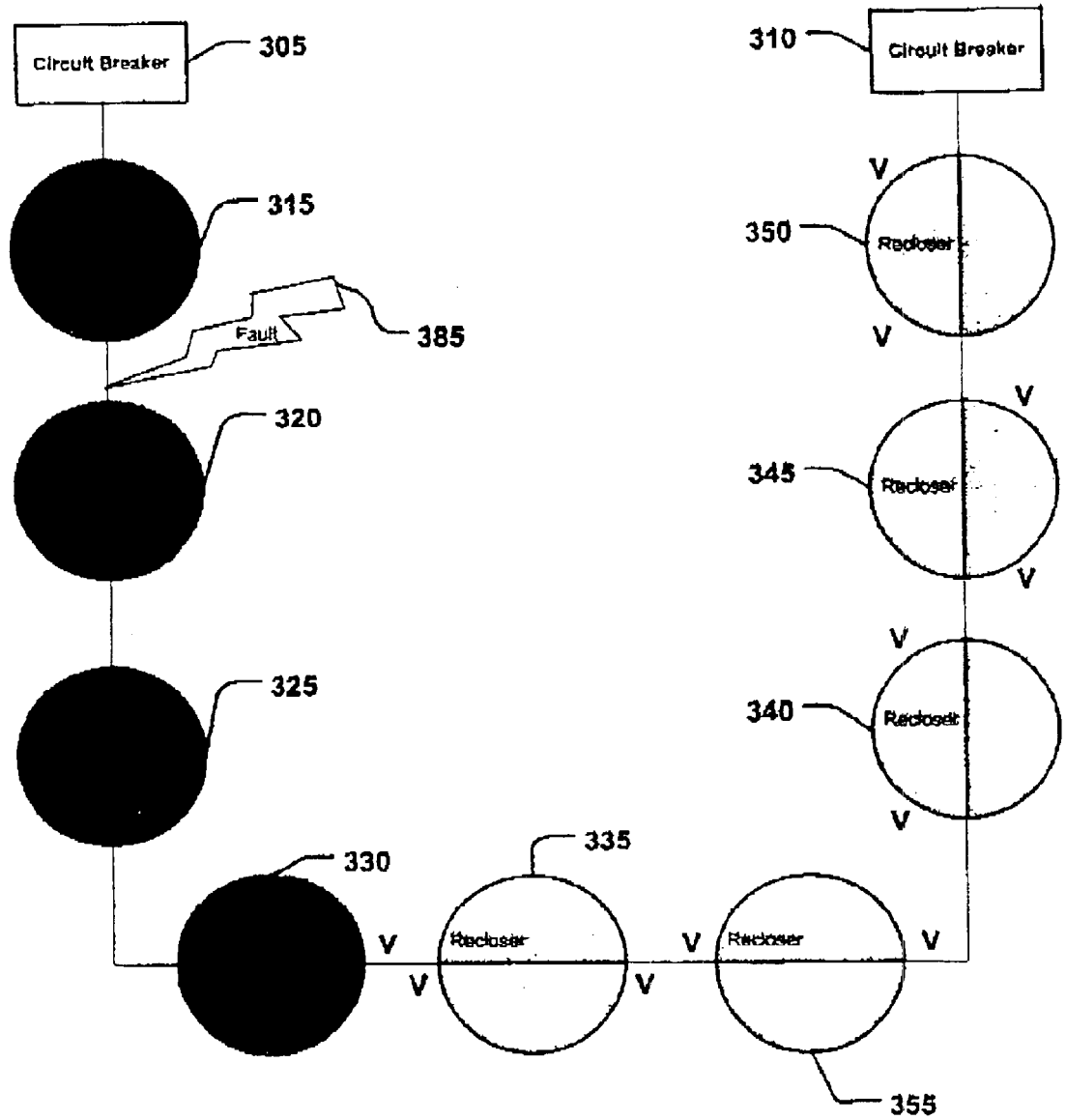
Figure 3D:
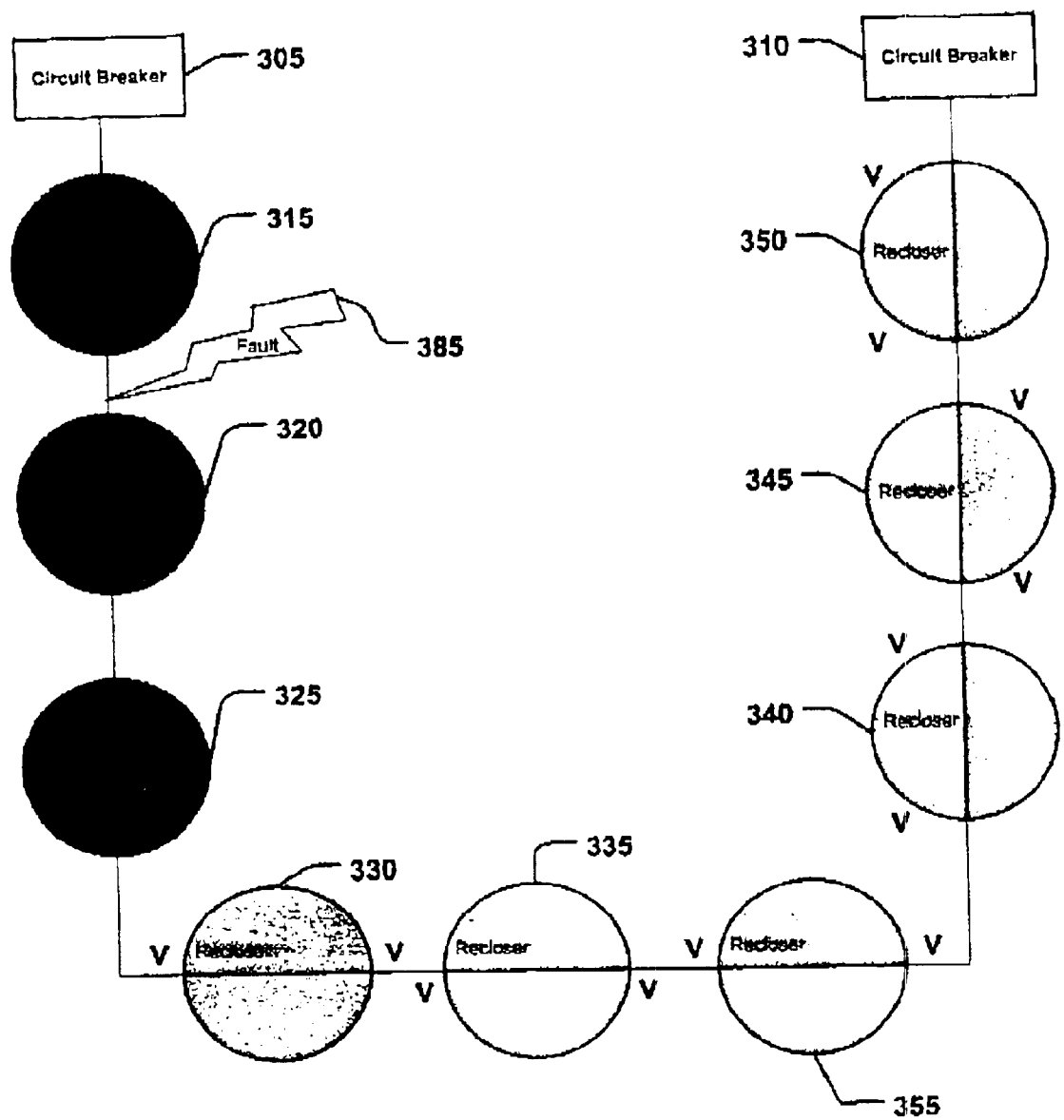
Figure 3E:
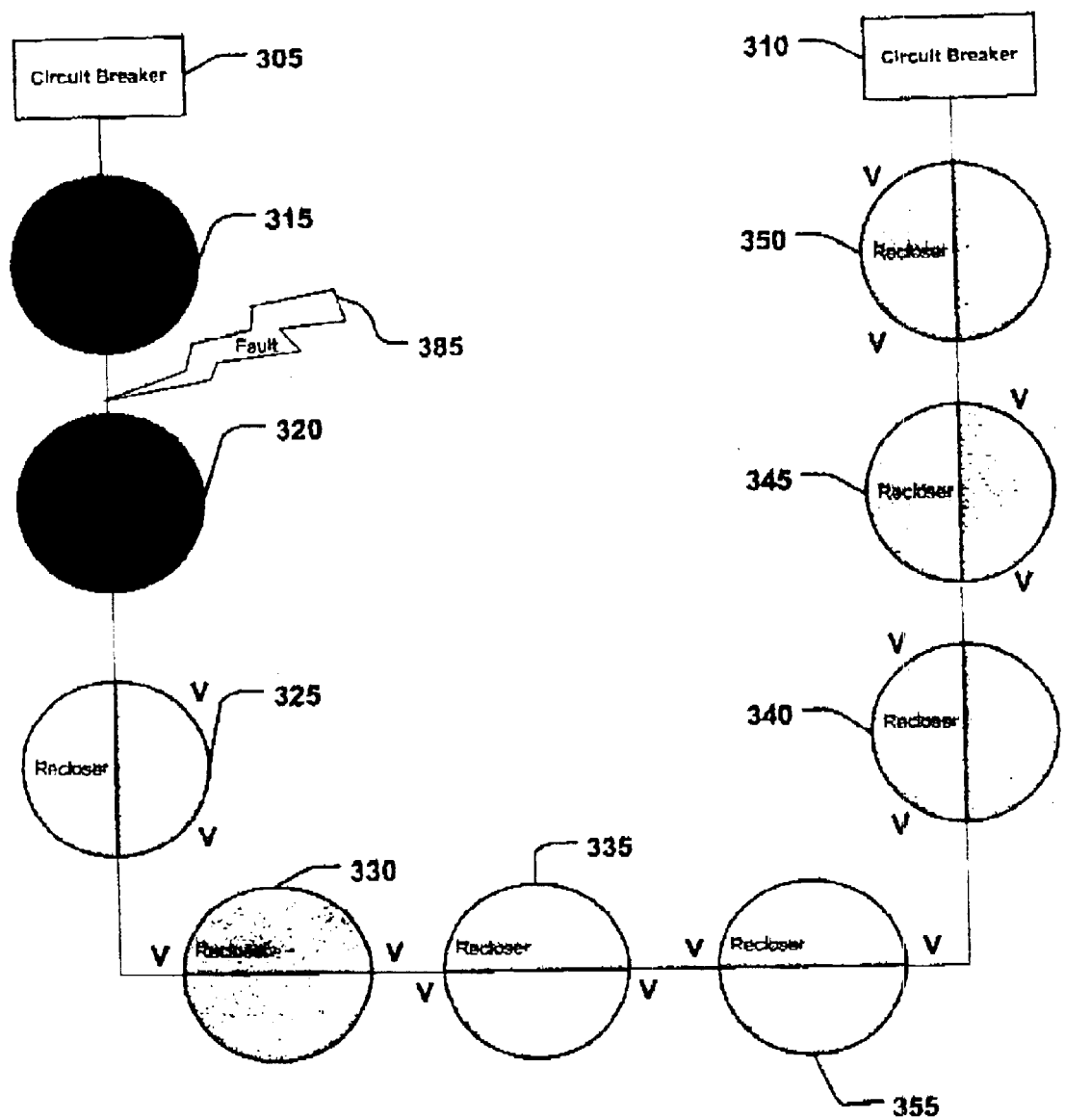
Figure 3F:
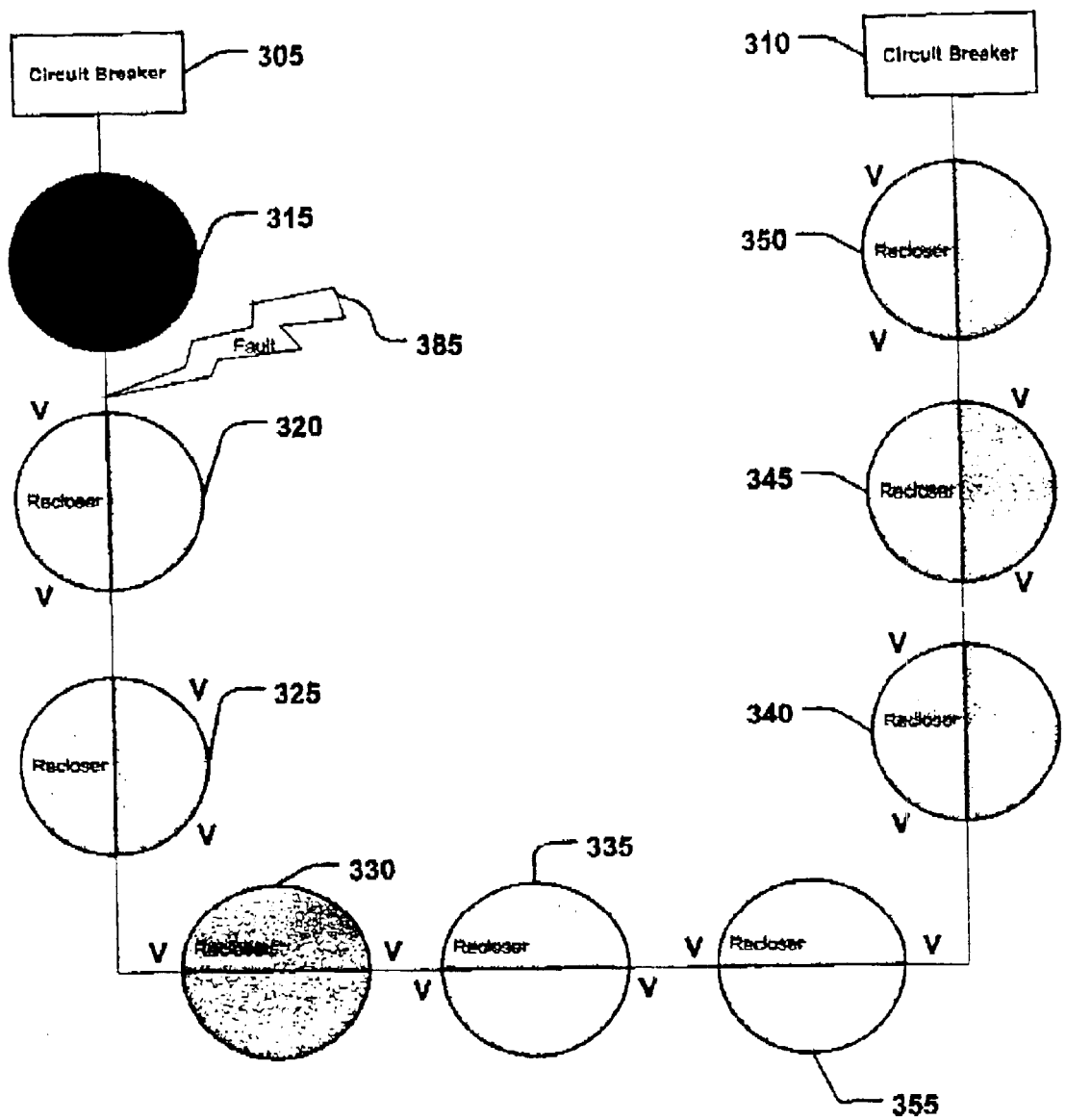
Figure 3G:
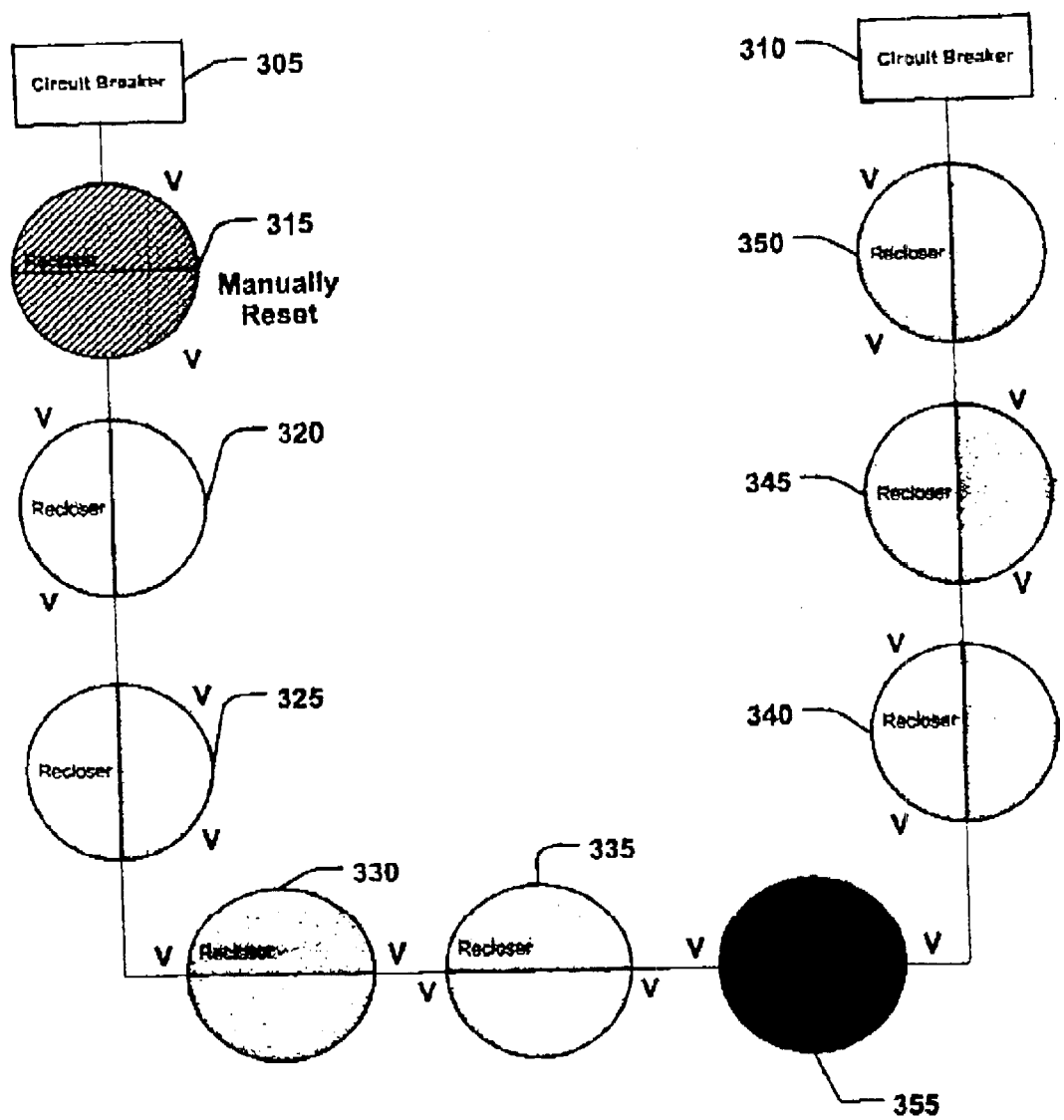

FIGS. 3A–3G illustrate the operation of the restoration scheme on exemplary power distribution system 300 when power distribution system experiences a fault. Fault 385 (e.g. lightning, fallen tree, or sever ice) may afflict power distribution system such that power is interrupted along power distribution system. In the example provided, fault 385 strikes power distribution system between recloser 315 and recloser 320. Upon the occurrence of fault 385, recloser 315 trips from the closed state to the open state. In response the restoration scheme starts to take affect. The goal of the restoration scheme is to reanimate a failed power distribution system such that power may be delivered to as many power distribution nodes of the failed power distribution system as possible. Upon the occurrence of a fault, reclosers 315, 320, 325, 330, 335, 340, 345, 350, and 355, maintain instructions and logic that realize a power restoration scheme. Generally, if there is a drastic change in voltage and/or current at the input or output of a recloser, the recloser trips to its opposite state (e.g. if a recloser is closed it trips open or vice versa). Once tripped, the recloser will attempt to reclose after a set period of time so that power can pass from a voltage bearing side of the recloser to a non-voltage bearing side. In FIGS. 3–3G the presence of the letter "V" indicates a voltage-bearing side of a recloser.

Recloser 315 maintains logic such that it trips to an open state upon the detection (e.g. by the voltage sensing transformers) of a dead voltage at either of its input or output terminals. Reclosers 320, 325, 330, and 335 maintain similar logic such that if there is change in the live or dead voltage at their input or output terminals they trip to an open state. Comparatively, sectionalizing recloser 355 maintains logic that trips recloser 355 to an open state upon the detection (e.g. by the voltage-sensing transformers) of a dead voltage at its input or output terminal.

Accordingly and as shown in FIG. 3B, reclosers 320, 325, 330, and 335 trip from their closed state to an open state in response to fault 385. Further, in response to reclosers 320, 325, 330, and 335 closing sectionalizing recloser 355 trips from its open state to a closed state as the voltage at its output level changes (e.g. recloser 335 opens). By having sectionalizing recloser 355 trip from an open state to a closed state power can be delivered from source breaker 310 to the rest of the failed power distribution system.

FIGS. 3C–3G show the states of reclosers of power distribution system as the restoration scheme continues to take effect. As shown in FIG. 3C, reclosers 315, 320, 325, and 330 remain in their open position. However, recloser 335 is shown to be in a closed position. In response to sectionalizing recloser 355 tripping from an open to a closed state, recloser 335 now has live voltage at one of its terminals. As such, recloser 335 attempts to reclose. If successful, the recloser will close and allow power to pass through such that there is live voltage at both of its terminals (e.g. its input and output terminals). However, if unsuccessful (e.g. a condition exists such that the recloser is not allowed to reclose—e.g. the continuing presence of a fault, or if programmed to stay opened), the recloser locks out and remains open. In the example provided, recloser 335 is successful in its bid to close. Accordingly, power is allowed to pass through recloser 335. Recloser's 335 success has impact on the rest of the system as recloser 330, which is serially connected to recloser 335, now has voltage at one of its terminals.

Accordingly, and as shown in FIG. 3D, recloser 330, now having voltage at one of its terminals, will attempt to reclose in a similar manner as to recloser 335. In the example provided, recloser 330 is successful in its attempt to reclose thereby allowing power to flow through and providing power to a terminal of recloser 325. As shown in FIG. 3E, recloser 325 will attempt to reclose in a manner similar to the operation of reclosers 330 and 335. In the example provided, recloser 325 is successful providing power to recloser 320. FIG. 3F shows that recloser 320 is successful in closing such that it may deliver power to recloser 315. Unlike the other reclosers, recloser 315 will not attempt to reclose. The restoration scheme requires that reclosers connected closest to the source circuit breakers remain open upon the occurrence of a fault. This recloser will remain open regardless if a voltage is sensed at one of its terminals subsequent to the occurrence of the fault. At this point, power distribution system operators monitoring the power distribution system would deploy a ground crew to manually reset recloser 315. As FIG. 3G shows, during the manual reset of recloser 315, recloser 335 trips to an open state such to bring the power distribution system back to its originally operating state (as shown in FIG. 3).

Figure 4:
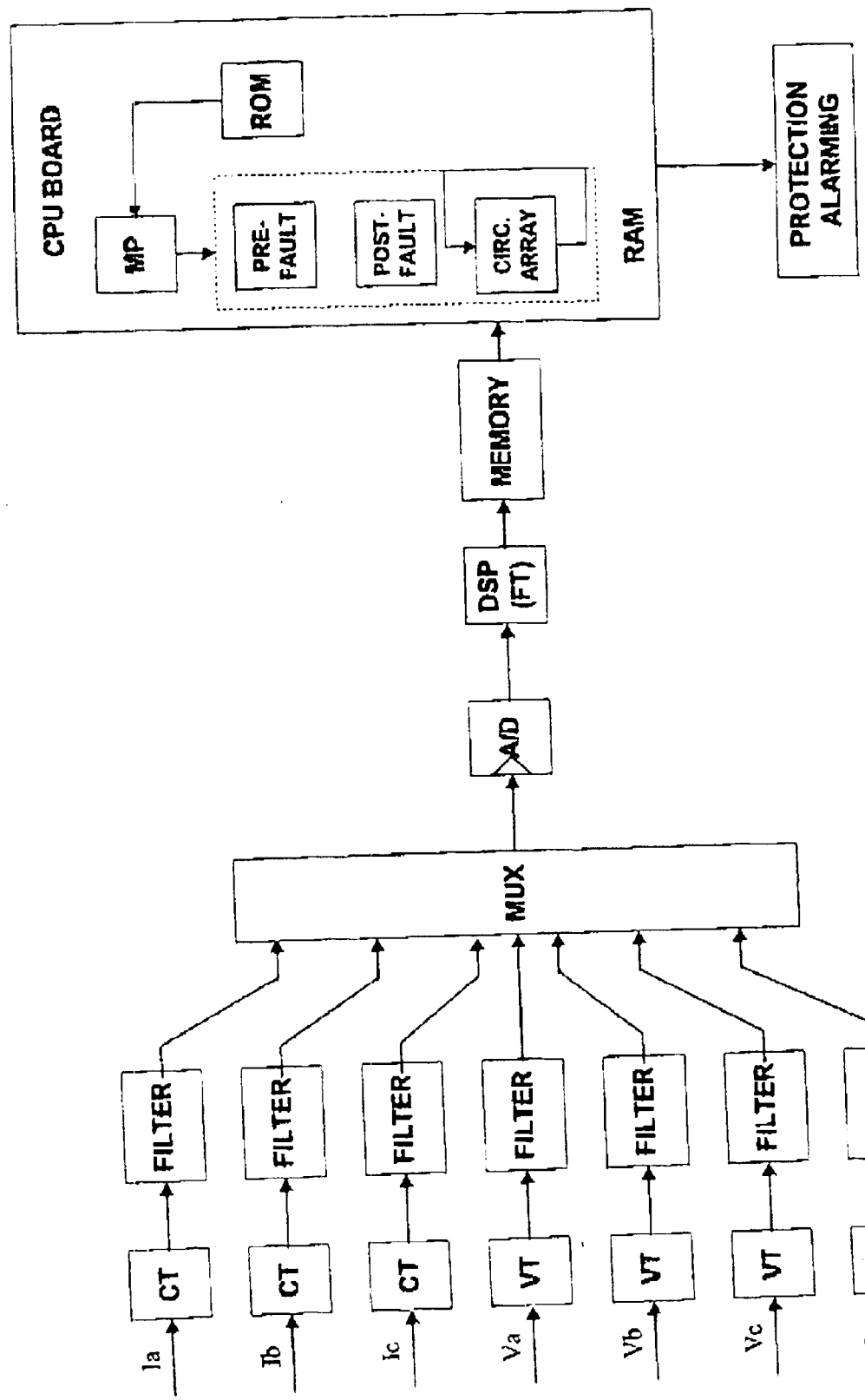
FIG. 4 is a block diagram showing the elements of exemplary power distribution system equipment performing the steps of the restoration scheme of the present invention.

Power Distribution System Equipment:

FIG. 4 depicts one presently preferred embodiment of a recloser employed by a restoration scheme in accordance with the present invention. As shown, the recloser comprises current and voltage transducers 10, filters 12, and a multiplexer 14, the latter outputting an interleaved stream of analog phase current and voltage signal samples, as well as neutral current samples. The analog multiplex output by the multiplexer 14 is digitized by an analog-to-digital converter 16. The output of the analog-to-digital converter 16 is fed to a digital signal processing block 18. The digital signal processing block 18 employs a Fourier transformation to produce phasor data for each of the sampled channels. The phasor data is stored in a memory 20. The phasor data in the memory 20 is fed via a 16-bit data bus to a central processing unit (CPU) board 22. The CPU board 22 includes a microprocessor 22-1, random access memory 22-2, and read only memory (ROM) 22-3. The (ROM) 22-3 contains program code controlling the microprocessor 22-1 in performing fault typing, fault location, and reporting functions. Additionally, ROM 22-3 contains the instructions used by microprocessor 22-1 to perform the voltage sensing and tripping functions required by the restoration scheme. The random access memory 22-2 includes a pre-fault segment of memory, a post-fault segment of memory, and a circular array, which are employed as described below in performing the fault typing and fault location functions. Further, CPU board 22 outputs fault data to a protection/alarming block 24 that performs protection and alarming functions such as tripping a circuit breaker or sounding an alarm as appropriate such that power distribution system operators are placed on notice of the recloser's state.

Figure 5:
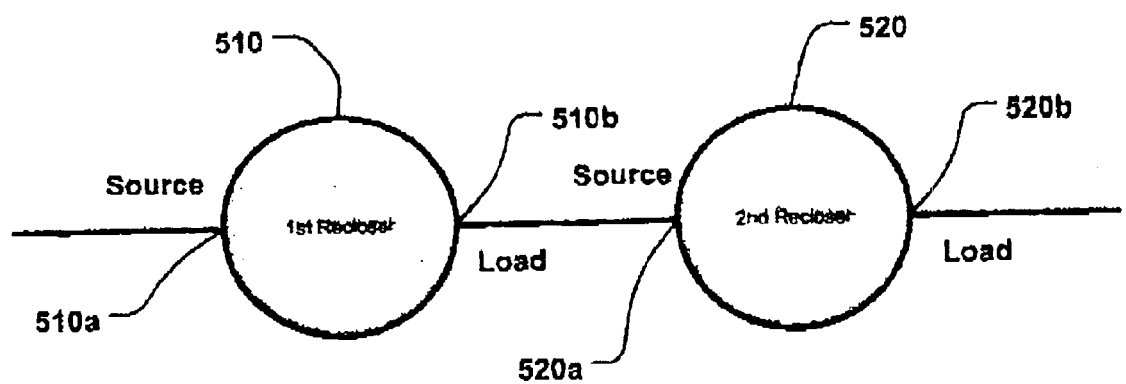
FIG. 5 is a block diagram of a restoration control module configuration in accordance with the present invention.

FIG. 5 depicts one presently preferred embodiment of a restoration control module configuration that may be employed in providing a restoration scheme in accordance with the present invention. As shown, restoration control module configuration comprises a first recloser 510 and a second recloser 520 having restoration control module (RCM) 515, coupled by an electrical line 515. Recloser 510 has an input 510a and an output 510b that denote a source side and load side, respectively. Similarly, recloser 520 has an input 520a and an output 520b that denote a source side and load side, respectively. Recloser 510 and 520 are part of power distribution system (not shown). When the power distribution system experiences a fault, it will generally occur between two reclosers, such as, recloser 510 and recloser 520. In this scenario, on the upstream device (e.g. recloser 510) the fault is located on the load side (e.g. 510b) and on the downstream device (e.g. recloser 520), the fault is located on the source side (e.g. 520a). This condition generally holds true for the majority of faults presented to the power distribution system.

In operation, RCM 515 will analyze and isolate the faults occurring on the hosting power distribution system. RCM 515 communicates with and receives information from the hosting recloser (e.g. recloser 510) and from upstream devices (e.g. recloser 520) via binary inputs and binary outputs. RCM cooperates with its host recloser to open or close the host recloser depending on various fault and non-fault conditions. Examples of such conditions are as follows: 1) if there is "dead voltage" (i.e voltage below a set threshold level) at both the source 510a of recloser 510 and source 520a of recloser 520, recloser 510 RCM 515 residing in recloser 510 opens recloser 510; 2) if there is "dead voltage" at source 510a and "live voltage" (i.e. voltage above a set threshold level) at source 520a of recloser 520, RCM 515 residing in recloser 510 closes recloser 510; and 3) if there is "dead voltage" at source 520a and "live voltage" at source 510a of recloser 510, RCM 515 residing in recloser 520 closes recloser 520. Using these exemplary rules, RCM 515 cooperates with power distribution equipment to effectively reanimate portions of (or entire) power distribution systems.

Figure 6:
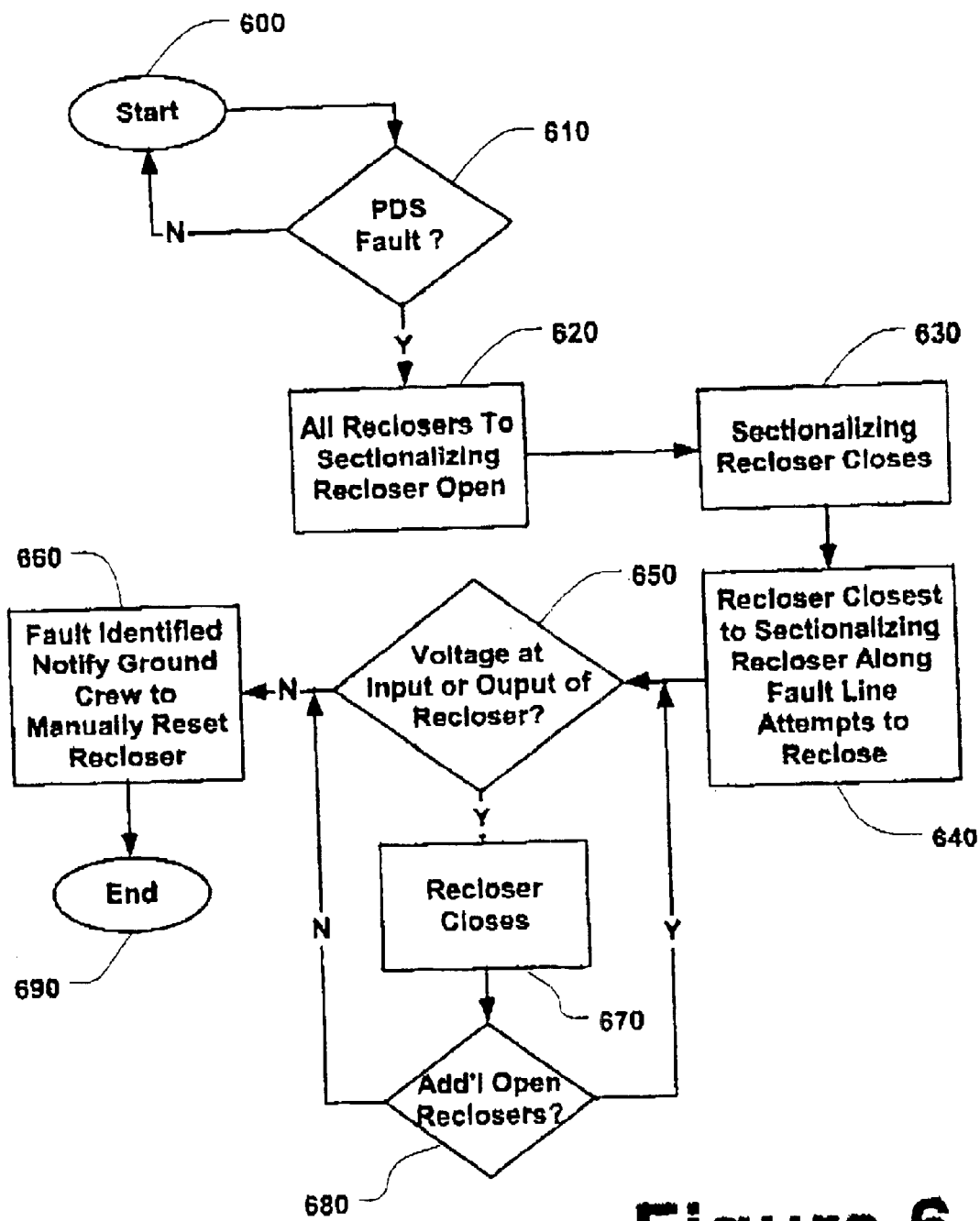
FIG. 6 is a flowchart of the processing performed by the power distribution system to re-animate a power distribution system that has experienced a fault in accordance with the restoration scheme of the present invention.

Restoration Scheme Processing:

FIG. 6 is a flowchart of the processing performed by power distribution system components employing the restoration scheme of the present invention to handle a fault along the power distribution system and the steps undertaken to reanimate the power distribution system. Processing begins at block 600 and proceeds to block 610 where a check is performed to determine if a fault has occurred along the power distribution system (PDS). A fault may be detected by checking power distribution system equipment for drastic changes in voltage or current. If there a fault has not been detected, processing reverts to block 600 and proceeds therefrom. However, if the alternative proves to be true, processing proceeds to block 620, where all of the power distribution system equipment (e.g. reclosers) up until a sectionalizing recloser trips to an open state. Processing proceeds to block 630 where the sectionalizing recloser (e.g. sectionalizing recloser) is tripped to a close state. The power distribution system equipment closest to the sectionalizing power distribution source then attempts to close at block 640. In this effort a check is performed at block 650 to determine if there exists a voltage or current at the input or output of the attempting power distribution equipment. If this check proves to be negative, processing proceeds to block 660 where the ground crew are notified to manually reset this power distribution equipment as it is deemed to be where the fault has occurred. Processing then proceeds to terminate at block 660. However, if the alternative proves to be true at block 650, the attempting power distribution equipment closes to allow current and voltage to pass at block 670. A check is then performed at block 680 to determine if there are additional open power distribution system equipment. If there are additional open power distribution system equipment, processing reverts to block 650 and proceeds therefrom. However, if the results of this check indicate that there are additional open power distribution system equipment, processing reverts to block 660 and proceeds therefrom.

Conclusion:

In sum, the present invention provides a system and methods providing a robust restoration scheme for power distribution systems. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

For example, the present invention may be implemented in a variety of power distribution systems. The various techniques described herein may be implemented in a variety of hardware or software, or a combination of both. Preferably, the techniques are implemented in power distribution control devices having digital signal processors, a storage medium readable by the processor (including volatile and non-volatile memory and/or storage elements) operating various computer programs. Program code is applied to perform the functions described above and to generate output information. The output information is applied to one or more of the power distribution components. Each program is preferably implemented in assembly or machine language. However, the programs can be implemented in a high level procedural or object oriented programming language to communicate with a computer system, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims.

What is claimed is:

1. A power restoration recloser for use in a power distribution system having first and second power sources, said recloser comprising:

(a) an input having an input sensor for sensing voltage and/or current;

(b) an output having an output sensor for sensing voltage and/or current;

(c) a microprocessor for controlling the connection of power between the input and the output in accordance with a control scheme, wherein the connection of power is closed under a normal power condition to permit power to flow between the input and the output, and wherein:

(i) the control scheme monitors the voltage and/or current at the input and the output;

(ii) if, as a result of a fault in the power distribution system, the input sensor senses a substantial change in the voltage or current at the input, or the output sensor senses a substantial change in the voltage or current at the output, the control scheme opens the connection of power between the input and the output to stop the flow of power between the input and the output; and (iii) if the power connection is open and the input sensor senses voltage or current at the input, or the output sensor senses voltage or current at the output, the control scheme attempts to reclose the connection of power between the input and the output to permit power to flow between the input and the output.

2. The power restoration recloser of claim 1, wherein the input sensor comprises a voltage sensing transformer.

3. The power restoration recloser of claim 1, further comprising read only memory (ROM) for storing instructions for performing the control scheme.

4. The power restoration recloser of claim 1, wherein when the power restoration recloser is connected into the power distribution system and there is a normal power condition, power from the first power source flows through the input to the output, and wherein when the power restoration recloser is connected into the power distribution system and the power restoration recloser has reclosed after a fault, power from the second source flows through the output to the input.

5. A power distribution circuit connected between first and second power sources, said power circuit comprising:

(a) a sectionalizing recloser connected between the first and second power sources, said sectionalizing recloser being open under normal power conditions so as to divide the power distribution circuit into a pair of sections, said sectionalizing recloser having an input and an output and being operable to close when the sectionalizing recloser senses a dead voltage at the input or the output, thereby connecting the sections; and (b) a pair of power restoration reclosers connected to the sectionalizing recloser and respectively disposed in the pair of sections of the power distribution circuit, each of said power restoration reclosers being closed under normal power conditions and having an input and an output, each of said power restoration reclosers being operable to: (i.) open when the power restoration recloser senses a substantial change in the voltage or current at the input or the output that occurs as a result of a fault in the section in which the power restoration recloser is located, and (ii.) attempt to reclose when the power restoration recloser senses voltage or current at the input or the output, and (c) whereby upon the occurrence of a fault in an affected one of the sections, the power restoration recloser in the affected section opens, thereby causing the sectionalizing recloser to close, which causes power to be provided to the power restoration recloser in the affected section, thereby causing the power restoration recloser in the affected section to attempt to reclose.

6. The power distribution circuit of claim 5, wherein the power restoration reclosers are located distal to the first and second power sources, respectively, and wherein the power distribution circuit further comprises:

a pair of proximate power restoration reclosers connected to the sectionalizing recloser and respectively disposed in the pair of sections of the power distribution circuit, said proximate power restoration reclosers being located proximate to the first and second power sources, respectively, and each having an input and an output and being dosed under normal power conditions, each of said proximate power restoration reclosers being operable to lock open when the proximate power restoration recloser senses a substantial change in the voltage and/or current at the input or the output that occurs as a result of a fault in the section in which the proximate power restoration recloser is located.

7. The power distribution circuit of claim 6, wherein the proximate power restoration reclosers, the distal power restoration reclosers and the sectionalizing recloser are serially connected together.

8. The power distribution circuit of claim 7, wherein the sectionalizing recloser is directly connected between the distal power restoration reclosers, and wherein the proximate power restoration reclosers are directly connected to the first and second power sources, respectively.

9. The power distribution circuit of claim 6, wherein after the occurrence of a fault in an affected one of the sections, the proximate power restoration recloser remains locked open until the proximate power restoration recloser is manually reclosed.

10. The power distribution circuit of claim 9, wherein after the occurrence of a fault in an affected one of the sections, the sectionalizing recloser opens when the proximate power restoration recloser in the affected section is manually reclosed.

11. The power distribution circuit of claim 6, wherein each of the inputs and the outputs of the proximate and distal power restoration reclosers has a sensor for sensing voltage and/or current.

12. The power distribution circuit of claim 11, wherein the sensors comprise voltage sensing transformers.

13. The power distribution circuit of claim 5, wherein when there are normal power conditions in a first one of the sections connected to the first power source, power from the first power source flows through the power restoration recloser in the first section from the input to the output, and wherein when the power restoration recloser in the first section has reclosed after a fault in the first section, power from the second power source flows through the power restoration recloser in the first section from the output to the input.

14. A method of controlling the distribution of power in a circuit comprising: a sectionalizing recloser connected between first and second power sources, said sectionalizing recloser being open under normal power conditions so as to divide the power distribution circuit into a pair of sections; and a pair of power restoration reclosers connected to the sectionalizing recloser and being respectively. disposed in the pair of sections; wherein the method comprises the steps of:

(a) monitoring the voltage and/or current at inputs and outputs of the sectionalizing recloser and the power restoration reclosers;

(b) detecting a substantial change in the voltage or current at the input or the output of the power restoration recloser in one of the sections affected by a fault;

(c) in response to detecting the substantial change in the voltage or current, opening the power restoration recloser in the affected section, thereby causing a dead voltage at the input or the output of the sectionalizing recloser;

(c) detecting the dead voltage at the input or the output of the sectionalizing recloser;

(d) in response to detecting the dead voltage, closing the sectionalizing recloser, thereby providing power to the input or the output of the power restoration recloser in the affected section;

(e) detecting current or voltage at the input or the output of the power restoration recloser in the affected section; and (f) in response to detecting current or voltage at the input or the output of the power restoration recloser in the affected section, attempting to reclose the power restoration recloser in the affected section.

* * * * *